United States Patent Office 3,124,462
Patented Mar. 10, 1964

3,124,462
PROCESS OF PREPARING AND PACKAGING
FRESH PORK SAUSAGE
Virgil W. Vogel and Paul W. Vogel, Pekin, Ill., assignors to Bird Provision Co., Pekin, Ill., a corporation of Illinois
No Drawing. Filed Aug. 10, 1960, Ser. No. 48,561
7 Claims. (Cl. 99—109)

The present invention relates to a process or method of preparing sausages containing ground processed meat products from the carcass of a hog or the like.

In the preparation of ground meat sausages the particular problem encountered is to so prepare the product that it may be stored for prolonged periods of time without spoilage, discoloration and without loss of its flavor. It has accordingly been heretofore recognized that discoloration and spoilage occurs by virtue of contact of the ground meat products with the oxygen of the air so that various chemical reactions occur by virtue of the oxygen in the air and various microorganisms in the air which cause the discoloration, spoilage and loss of flavor hereinabove indicated. Accordingly, it has heretofore been proposed to remove air voids and contact of the air with the ground meat products stuffed into the sausage casings by operating within the medium of an inert gas so as to avoid the deleterious affects of air which comes in contact with the meat products prior to sealing thereof within the sausage casings. Other practices also involve the use of chemical preservatives and immediate freezing of the meat products so as to reduce spoilage prior to packaging thereof within the sausage casings. The prior processes however involved not only expensive equipment but also involved a loss of flavor and the quality of freshness that is retained when the process in accordance with this invention is practiced. Also, the process practiced in accordance with this invention avoids spoilage and discoloration of the meat products from contact with the air prior to sealing thereof within the sausage casings with air voids eliminated therefrom and yet retains the flavor and freshness of the meat products.

The process of this invention therefore involves the boning of an animal carcass after is has been properly bled and while it is still hot, the process then being completed within the shortest possible time so as to retain the highest possible temperatures whereby the meat products are maintained warm and fluent with a subsequent minimum of air voids prior to the packaging thereof within the sausage casings. Accordingly the meat products are stuffed and sealed within the sausage casings to an extent necessary to eliminate air voids therein after which the product may optionally be frozen for the first time for subsequent storage within a freezer and consumption. The casings of the sausages are accordingly made of a material having a minimum of oxygen permeability. Accordingly, the temperatures and time within operative ranges of variations, preceding the freezing operation are critical factors in the process of this invention.

An important object of this invention is therefore to provide a highly practical method of preparing meat products and packaging thereof into sausage casings to retain the fresh flavor qualities thereof for a prolonged period of time.

Another object of this invention is to provide a process for preparing and packaging meat sausages requiring less expensive apparatus and processes heretofore practiced and yet able to cope with the problems of spoilage, discoloration and loss of flavor in a more efficient and complete manner.

Other objects of this invention will become apparent hereafter from the more detailed description of the invention which is to follow, said description being clearly illustrative of the principles and concepts embodied in the invention.

The process of this invention although described with respect to hogs from which pork sausages are made is not necessarily restricted thereto but may be applied to other animals from which ground meat sausages are made. The process of this invention therefore results in a fresh pork sausage product which may be stored in a freezer for a period of more than one year without the product showing signs of rancidity of any noticeable change in its fresh pork flavor. The product may also be kept in a fresh meat case up to six weeks without any noticeable effect on its flavor or quality.

As hereinbefore indicated, the meat products are obtained from the carcass of the hog which has been freshly slaughtered and dressed. The carcass unlike in previous processes is not chilled but is immediately boned after it has been properly bled so as to remove all the skeletal meat therefrom in the form of trimmings. The boning of the carcass is accomplished while the internal temperature of the meat products thereof is not less than 100° F. while the boning operation is accomplished within 45 minutes from the time that the carcass had been properly bled. As a result thereof the meat trimmings will be taken from the carcass rapidly so that the trimmings are in a warm and fluent state.

The trimmings are then assembled in batches which are made up of the desirable portions of fat and meat components pursuant to some ratio of fat to lean with which it is desired to comply. The fat components shall be a blend of the most desirable fats taken from the same carcass as the meat component. Accordingly the fat component shall be made up of the sides and jowls of the carcass while any additional fat required shall be taken from the portion of the back adjacent to the sides. The less desirable fats such as the ham and shoulder fats will therefore not be used as part of the fat component.

The meat product trimmings will then be ground once only using a sharp well matched knife and plate having one-quarter inch holes therein. The grinding operation timed in accordance with the total time within which the entire process is to be performed, occurs immediately after assemblage of the meat and fat trimmings into the batches. The grinding operation is therefore completed within 55 minutes from the time that the hog carcass had been properly bled, the internal temperature of the trimmings remaining above 97° F. until it has been processed through the grinder so that the trimmings remain warm and fluent.

After grinding, the trimmings are thoroughly mixed and blended with seasoning, the mixing being effected by use of a regular sausage mixer operating for approximately 2 minutes to insure a thorough blending of the trimming components with the seasoning. A recommended seasoning may be composed of an admixture of various proportions of various ingredients as summarized in Table 1 as follows:

TABLE 1

Seasoning Admixture per 100 Lbs. Batch

| Ingredient: | Amount (ounces) |
|---|---|
| Fine flake salt | 26 |
| Granulated sugar | 4 |
| Finely ground black pepper | 4 |
| Monosodium glutamate | 2 |

The mixing of the seasoned trimmings must be performed in less than an hour from the time that the hog carcass is properly bled so that the internal temperature of the trimmings will be not less than 95° F. The mixed and seasoned trimmings will accordingly still be warm and fluent.

Immediately after mixing the seasoned trimmings, the trimmings will be stuffed into the sausage casings within 5 minutes. The temperature of the product during the stuffing operation will therefore be at least 92° F. The stuffing process is performed by dispensing the meat trimmings from an air stuffer under 75 p.s.i. of pressure into the sausage casings which are made up of a film like material being impermeable to air. Accordingly, casing material such as vinylidene chloride copolymer (Saran) may be used or other suitable equivalent materials. Immediately after stuffing, the trimmings are settled within the casings so as to remove all air voids therefrom and the top of the casings securely tied to seal the trimmings therein. By virtue of the warm and fluent state of the trimmings when stuffed into the casings and settled therein, small air pockets will not tend to form as would be the case with trimmings from a carcass that had been previously chilled prior to grinding and mixing of the trimmings. Also, apparently the meat trimmings while in warm and fluent state contains live tissues which consumes oxygen that usually occurs entrapped within the casing to further reduce the deleterious affects of oxygen after rigor mortis sets in. It will therefore be appreciated that by performing the process while the products of the carcass are still warm and fluent not only are air voids ordinarily retained within the casings reduced and the deleterious affects thereof obviated but also the meat trimmings are packaged within the casings with their fresh flavor qualities. This is not possible under prior processes because packaging does not immediately follow the slaughter, but is deliberately delayed to meet demand in order to provide a product that is at least freshly packaged.

Accordingly, the packaged product is placed in a freezer not more than 1½ hours after the hog carcass from which the product was prepared had been properly bled with the internal temperature of the product being not less than 90° F. The product may then be optionally frozen for a period of 2 hours and brought down to a temperature of 32° F. in order to subsequently enable the product to be stored within a household freezer for more than one year or within a fresh meat case for up to six weeks without any noticeable affect on the flavor or quality of the products.

As an alternative, the above described process may be performed from boning through mixing of the seasoned trimmings within a period of 3½ hours as long as the meat is not subjected to any adverse conditions and does not go below 80 to 82° F. during the 3½ hours duration. Thus, since the packaged product prepared in accordance with the present invention may be stored while awaiting demand, the performance of the process immediately following slaughter is feasible within the time and temperature limits found applicable for pork products.

The various steps of the foregoing processes together with the times involves and temperature ranges applicable to pork products are summarized in the following Table 2. It should of course be appreciated that the times and temperatures given are approximate and recommended values and not necessarily restrictive, there being an operative range of variation for each time and temperature value within which the invention may be practiced.

From the foregoing description, the nature, purpose and scope of the novel process of this invention will be apparent. It will therefore be understood that since the invention may be practiced in a number of embodiments without departing from the spirit and scope of the invention, the foregoing description is intended to be interpretated as illustrative and not in a limiting sense.

TABLE 2

| Steps | Time (min.) | | Temperature range (degrees F.) | Alternative | | |
|---|---|---|---|---|---|---|
| | Elapsed | Interval | | Time (min.) | | Temp. Range (degrees F.) |
| | | | | Elapsed | Interval | |
| Carcass, boned | 45 | 45 | 100 | | | |
| Meat and fat comp., batched and ground | 55 | 10 | 100-97 | 210 | 210 | 100-80 |
| Seasoning added | 58 | 3 | 97-95 | | | |
| Mixing | 60 | 2 | | | | |
| Stuffing | 65 | 5 | 95-92 | | | |
| Settling | 90 | 25 | 92-90 | | | |
| Freezing | 150 | 60 | 90-32 | | | |

What is claimed as new is as follows:

1. A method of preparing pork products, comprising the steps of: boning a freshly slaughtered carcass while still hot into trimmings; grinding desired carcass trimmings while still warm and fluent; mixing the ground trimmings while fluent and above approximately 80° F., mixing to be completed not more than approximately 3½ hours after the carcass has been bled and stuffing the warm and fluent mixed trimmings into air impermeable casings.

2. The method as defined in claim 1, wherein the trimmings are seasoned before mixing, mixing being completed within approximately one hour after the carcass has been bled and the internal temperature of the mixed and seasoned trimmings is not less than approximately 90° F.

3. The method as defined in claim 2, wherein the carcass is boned into trimmings within approximately 45 minutes after being bled while the internal temperature thereof is not less than approximately 100° F.

4. The method as defined in claim 3, wherein desired proportions of meat to fat components of the trimmings from the boned carcass are ground within approximately 55 minutes after the carcass has been bled while the internal temperature of the ground trimmings is not less than approximately 97° F.

5. The method as defined in claim 4, wherein the trimmings are settled within the casings for removal of voids and freezing the resulting product after approximately 1½ hours has elapsed since the carcass was bled with the internal temperature of the trimmings not less than approximately 90° F., the freezing interval being 2 hours during which time the internal temperature of the product is reduced to approximately 32° F.

6. The method as defined in claim 1, wherein the stuffed trimmings are permitted to settle within the casings.

7. A method of producing pork sausages comprising: bleeding a freshly slaughtered carcass; immediately hot boning the carcass following bleeding; grinding the boning products while fluent and hot into a state suitable for filling in sausage casings; filling air-impermeable casings with said ground boning products fresh, fluent and above 80° F. after the elapse of no more than 3½ hours following bleeding for freezing immediately thereafter so as to retain the fresh qualities thereof and avoid spoilage for a prolonged period of time.

References Cited in the file of this patent

UNITED STATES PATENTS

| | | |
|---|---|---|
| 2,355,548 | Musher | Aug. 8, 1944 |
| 2,760,868 | Thommen | Aug. 28, 1956 |
| 2,874,060 | Turner et al. | Feb. 17, 1959 |